United States Patent
Frost et al.

(10) Patent No.: US 10,320,914 B1
(45) Date of Patent: *Jun. 11, 2019

(54) REMOTE MONITORING OF ACTIVITY TRIGGERED SENSORS AND A CUSTOMIZED UPDATING APPLICATION

(71) Applicant: West Corporation, Omaha, NE (US)

(72) Inventors: Eileen Clare Frost, Omaha, NE (US); James K. Boutcher, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,479

(22) Filed: Oct. 31, 2017

Related U.S. Application Data

(63) Continuation of application No. 15/232,184, filed on Aug. 9, 2016, which is a continuation of application No. 14/283,341, filed on May 21, 2014, now Pat. No. 9,412,255.

(51) Int. Cl.
  *G08B 1/08* (2006.01)
  *H04L 29/08* (2006.01)
  *H04W 8/18* (2009.01)
  *G08B 21/18* (2006.01)

(52) U.S. Cl.
  CPC ............ *H04L 67/125* (2013.01); *G08B 21/18* (2013.01); *H04W 8/18* (2013.01)

(58) Field of Classification Search
  CPC .......... G08B 21/04; G08B 21/18; G08B 1/08; A61B 5/747; A61B 5/0002; H04L 67/22
  USPC ........ 340/501, 506, 527, 539.13, 541, 573.1
  See application file for complete search history.

(56) References Cited

U.S. PATENT DOCUMENTS

| | | | | |
|---|---|---|---|---|
| 7,764,167 B2* | 7/2010 | Reeves | ................. | G08B 21/04 |
| | | | | 340/426.22 |
| 8,866,619 B2* | 10/2014 | Knibbe | .............. | H05B 37/0227 |
| | | | | 340/426.22 |
| 2003/0117279 A1* | 6/2003 | Ueno | ................. | G06K 9/00335 |
| | | | | 340/523 |
| 2011/0080291 A1* | 4/2011 | Ishimoto | ............ | G08B 21/0423 |
| | | | | 340/573.1 |
| 2013/0073303 A1* | 3/2013 | Hsu | ..................... | H04L 12/2823 |
| | | | | 705/2 |

* cited by examiner

*Primary Examiner* — Phung Nguyen
(74) *Attorney, Agent, or Firm* — Raffi Gostanian

(57) ABSTRACT

Monitoring a particular home or place of business for activity may provide a remote subscriber with updated information regarding feedback from sensors at the remote location. One example method of operation may include receiving sensor data from one or more sensors that have been activated at the remote location, identifying a subscriber account associated with the sensor data, matching the sensor data with a predefined sensor identifier stored in the subscriber account, and generating a notification to include the predefined sensor identifier and a time reference indicator associated with a time the sensor data was activated.

20 Claims, 9 Drawing Sheets

REMOTE MONITORING OF ACTIVITY TRIGGERED SENSORS AND A CUSTOMIZED UPDATING APPLICATION

CROSS-REFERENCE TO RELATED APPLICATIONS

This application is a continuation from U.S. patent application Ser. No. 15/232,184, filed Aug. 9, 2016, entitled "REMOTE MONITORING OF ACTIVITY TRIGGERED SENSORS AND CUSTOMIZED UPDATING APPLICATION", which is a continuation from U.S. patent application Ser. No. 14/283,341, filed May 21, 2014, entitled "REMOTE MONITORING OF ACTIVITY TRIGGERED SENSORS AND A CUSTOMIZED UPDATING APPLICATION", now issued U.S. Pat. No. 9,412,555, each of which is incorporated by reference herein in its entirety.

Further, U.S. patent application Ser. No. 14/283,341 is related to U.S. patent application Ser. Nos. 14/283,356; 14/283,363; 14/283,371; 14/283,379; 14/283,389; 14/283,399; 14/283,405; 14/283,418; 14/283,424; 14/283,432; 14/283,437; 14/283,442; 14/283,451; 14/283,460; 14/283,467; which were filed on May 21, 2014, the entire contents of which are hereby incorporated by reference in their entirety.

TECHNICAL FIELD OF THE APPLICATION

This application relates to identifying ongoing activity at a particular house or other location and receiving updates regarding certain sensors that were triggered/not triggered based on a customized user application.

BACKGROUND OF THE APPLICATION

Conventionally, when the activities at a particular house, place of business or other designated location are desired to be logged or monitored by a user, the user would setup a camera that records the activities and store the video and/or audio on an accessible medium either locally or remotely. Other methods and procedures for monitoring activities are generally not available.

The amount of time required to review those videos or other recorded data is often larger than a user is capable of expending. Also, an event that occurs, such as a vandal break-in, emergency health situation, or other emergency event may not reach the interested user in a timely manner, and may not warrant a call to 911 to intervene and provide services that a home owner or private business owner could provide themselves.

By establishing customized monitoring criteria, the user may monitor a premises via one or more sensors, video feeds, audio feeds, etc. and decide whether a visit to the premises is necessary to identify a vandalism, emergency health situation or other emergency event. Also, adaptive monitoring may be employed to ensure trends are not broken which could lead to dangerous situations or health risks for those who are present near the place of interest.

SUMMARY OF THE APPLICATION

One example embodiment of the present application may provide a method that includes receiving sensor data from at least one sensor that has been activated at a remote location, identifying a subscriber account associated with the sensor data, matching the sensor data with a predefined sensor identifier stored in the subscriber account, and generating a notification to include the predefined sensor identifier and a time reference indicator associated with a time the sensor data was activated.

Another example embodiment may include an apparatus that includes a receiver configured to receive sensor data from at least one sensor that has been activated at a remote location, and a processor configured to identify a subscriber account associated with the sensor data, match the sensor data with a predefined sensor identifier stored in the subscriber account, and generate a notification to include the predefined sensor identifier and a time reference indicator associated with a time the sensor data was activated.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
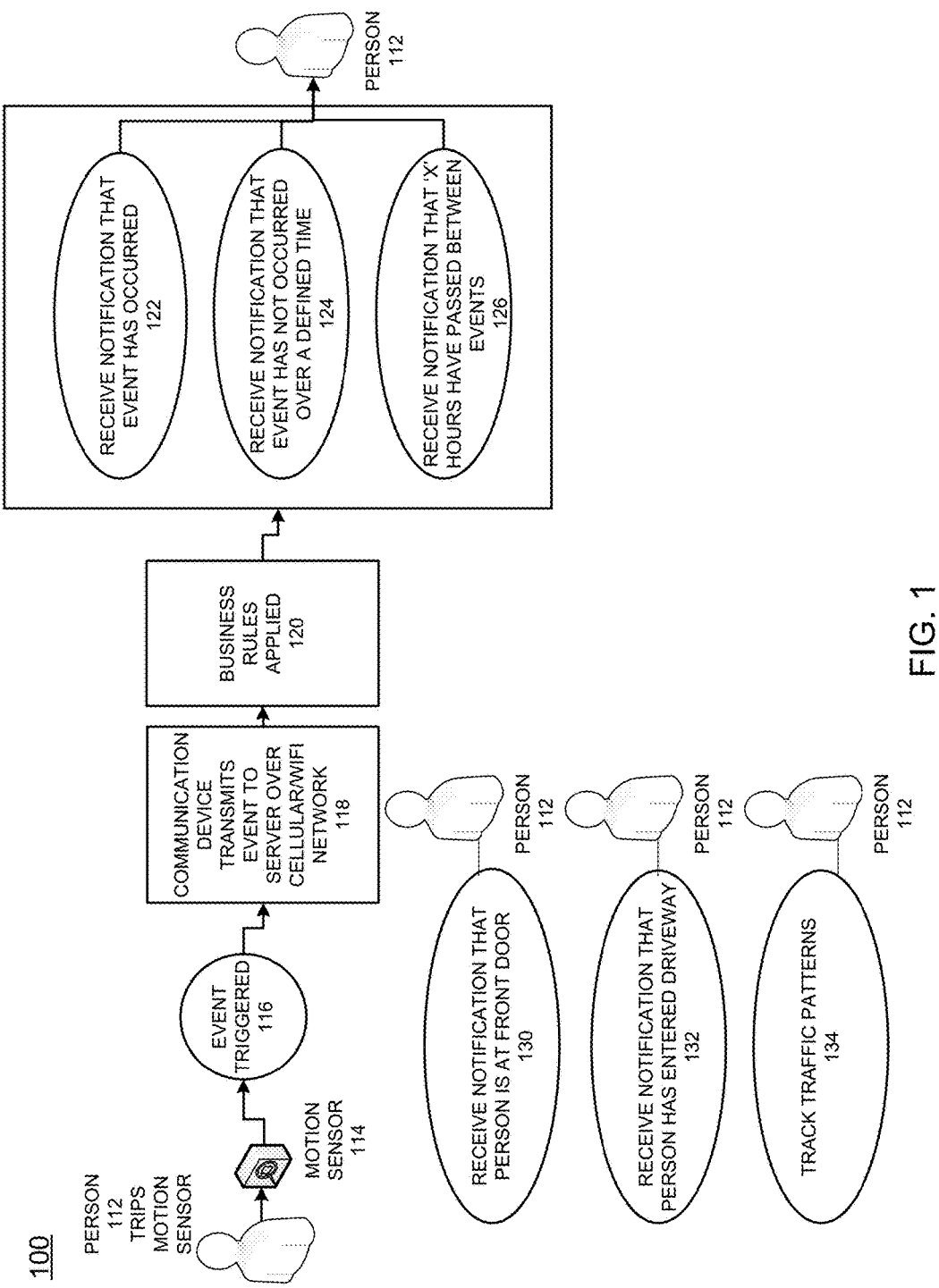
FIG. 1 illustrates an example logic flow diagram according to example embodiments of the present application.

FIG. 1 illustrates an example logic configuration of a user triggering the monitored sensors according to example embodiments. Referring to FIG. 1, the configuration 100 includes a person 112 who is the subject of the monitoring operations. The person 112 may be a known subject, such as an elderly person who is being tracked for their own personal safety and health or an unknown person who may have entered a home or premises that are being monitored to avoid unauthorized persons from accessing the premises as a security measure.

In one example, the person 112 may walk past a motion sensor 114 that is wired to a device detection unit or which has a BLUETOOTH interface that transmits a signal to a receiving unit that an event has been triggered 116 (i.e., the motion sensor has been tripped or activated). The receiving unit or access point may be a router, a wireless access point, a remote communication base station, etc. (not shown). The communication protocol may be BLUETOOTH®, a 3G/4G cellular communication standard that transmits a wireless signal to indicate that the sensor has been activated, and/or a standard WIFI network or 802.11a/b/n/g.

A local communication TX/RX device may receive the sensor activation(s) instances and time stamp those events, store those events, and/or transmit those events 118 to the access point for immediate communication relay to a remote server. In operation, the server that receives the sensor activation information over the Internet, stores the information in a user profile account and then applies business rules 120 to determine when a subscriber should be notified of the sensor event depending on the preferences available in their personal profile (e.g., notifications for each sensor activation, notifications for no sensor activation in a 12/24 hour period, etc., specific times associated with the sensor activation, etc.).

A few examples of a person 112 activating a motion sensor may include a subscriber initiating an audit application for receiving a notification that the event has occurred 122, and/or receiving a notification that an event has not occurred within a predefined time interval 124 (e.g., 12 hours since anyone at grandma's house has entered the bathroom). Another example provides that a specific number of hours 'X' has passed since the last event or sensor has received information or has been triggered 126, where the value of 'X' is set by the subscriber.

In this example, an adult may be monitoring their elderly parent and may desire to know if 8 hours passes before the bathroom sensor is triggered indicating a potential problem with the elderly parent if 8 hours has passed with no sensor indication in the bathroom. Other examples may provide a notification being sent if someone has triggered another sensor by the front door of the house 130 and/or a notification may be sent if a person or car has entered the driveway 132 via a driveway sensor and/or a traffic pattern sensor at a remote location or at the house identifying if the amount of traffic has increased 134.

Figure 2:
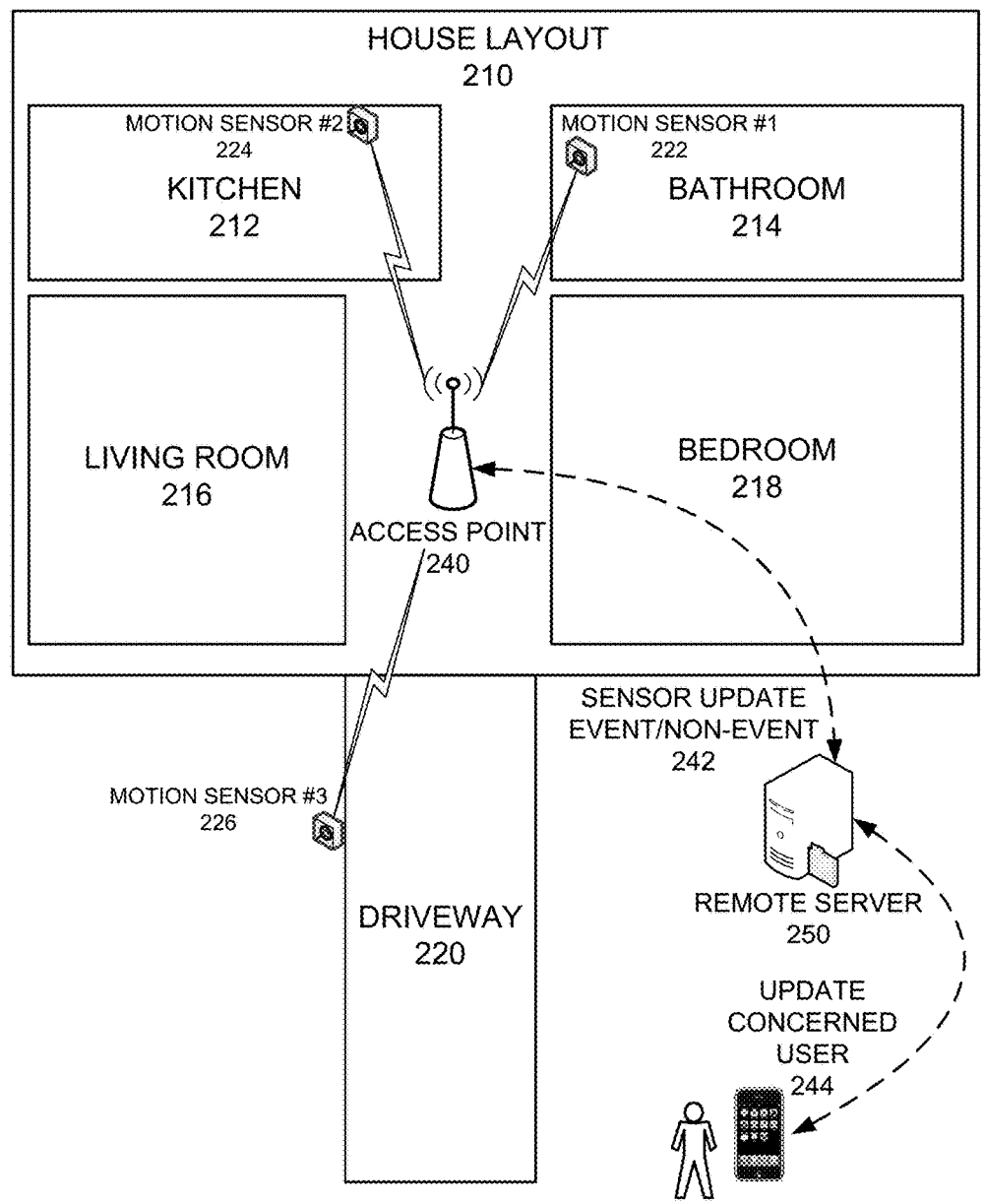
FIG. 2 illustrates an example home network of sensors and communication devices according to example embodiments.

FIG. 2 illustrates an example network configuration of a residential house providing sensor data to a remote tracking server according to example embodiments. Referring to FIG. 2, the network 200 illustrates the layout of a single-story home with three sensors currently employed. The house layout 210 has four rooms 212-218 and two of which have sensors installed. For example, the subscriber may have setup one sensor 224 in the kitchen 212 and another sensor 222 in the bathroom 214. The sensors may be battery power transmitters with sensors that detect light, movement, sound or other state changes, such as temperature, precipitation/moisture, heat, etc. The sensors may also be plugged into the wall outlet receptacles to provide constant power needed to transmit a signal to the local receiving device and/or access point 240. The driveway 220 may have a sensor 226 installed near the driveway to indicate if a person has walked up the driveway or a car has entered the driveway.

In operation, any time one of the sensors has identified a sensor trigger, which for this example will be movement, the sensor may transmit a wireless communication signal to a small receiving box or device that is in communication with the communication access point 240. The indication may provide a unique sensor identifier so it is clear which sensor has transmitted that indication and a timestamp may be linked to that particular sensor indication (e.g., sensor #2 has triggered a sensor indication at 8:15 am on Monday Feb. 23, 2014). The sensor indication may also be used to map the sensor to a predefined territory, such as a name entered into the application system (i.e., kitchen, bathroom, driveway) during the online setup that links the sensor indication or being triggers to the sensor ID number of that sensor. The access point 240 may, in turn, periodically transmit the updated data to a remote server 242 that links the sensor IDs to a particular user account so the notifications may be created accordingly (e.g., automated phone calls, text messages, emails, notify EMS-911, etc.). The sensor update operation 242 may be sent to the server 250 that stores the subscriber data profile which can be accessed and updated to include the recent indication or trigger, and which is also linked to an automated notification engine that transmits a call/email/text message to the predefined subscribed entity 244 depending on the preferences in the subscriber profile.

Figure 3:
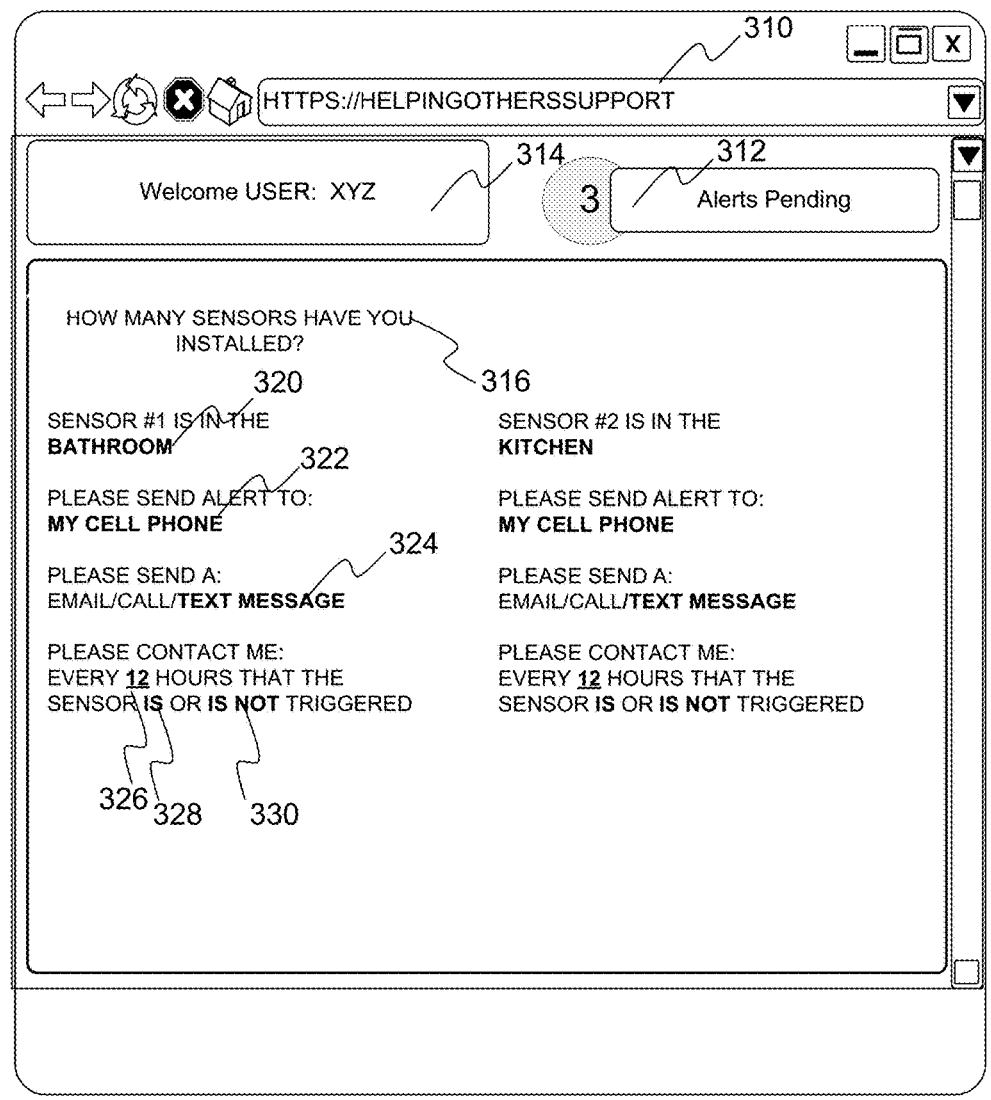
FIG. 3 illustrates an example web portal user interface for managing the sensor information according to example embodiments of the present application.

FIG. 3 illustrates a web interface that is used to setup and execute the subscriber profile and corresponding notification system according to example embodiments. Referring to FIG. 3, the sensors being engaged and transmitting notifications to the server may include a customized reporting platform that is initiated prior to use and which may be updated to accommodate the user's desired notification scheme. The platform 300 may include a user interface via a web portal or web site that is used to login and setup the notification preferences. In one example, the website may have a particular address 310 and a welcome message 314 that identifies the user as having successfully logged into the application. The number of alerts may be setup 312 for a display that provides the user/subscriber with a snapshot of how many notifications or important messages that have been received and which require confirmations. The subscriber may setup certain options for each sensor that is employed 316. For example, the first sensor 320 may be identified by a code or identifier name and may be installed in any room or place specified by the subscriber, such as bedroom, bathroom, kitchen, outside, basement, living room, etc. The subscriber may also specify a notification preference 322, such as home phone, cell phone, email, telephone call via an automate or live agent, etc. The contact message type may also be specified 324. The more specific setup information may be setup to include a time interval 326 and whether one or more sensors are triggered 328 and/or are not triggered 330 within that time interval. This way the subscriber can identify if the sensors are being triggered as expected and when the sensors are not being triggered as expected.

Figure 4:
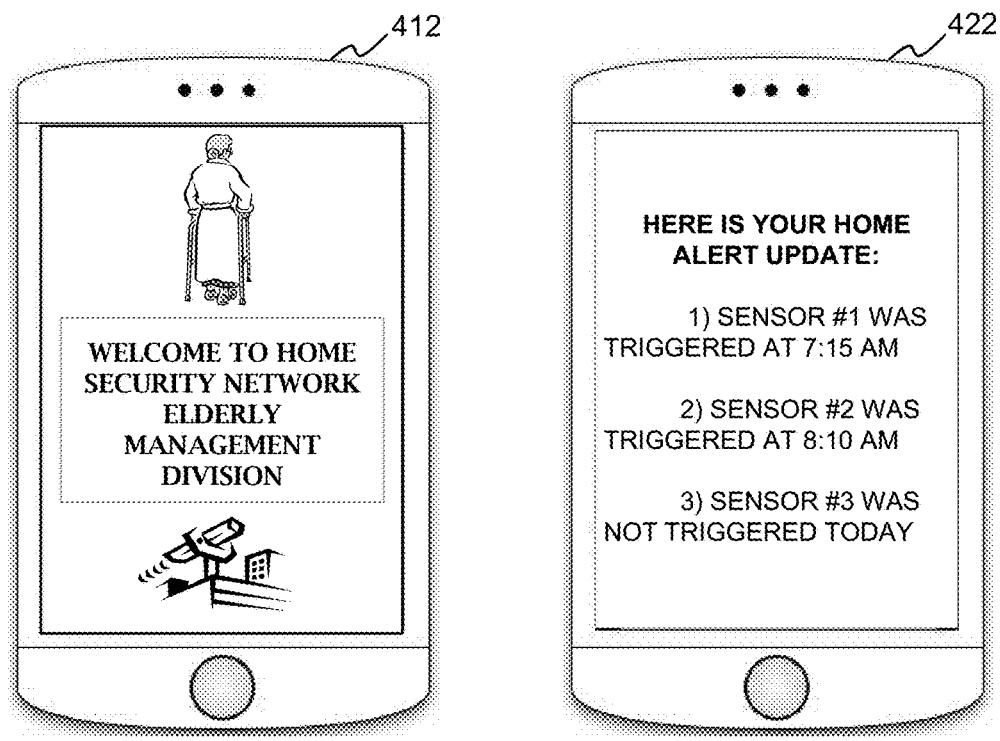
FIG. 4 illustrates an example user interface of a smartphone application according to example embodiments of the present application.

FIG. 4 illustrates an example user interface 400 of the subscriber's application interface on a smartphone device. In one example, the user may access the application via a main screen interface 412, which is accessed manually or automatically when a notification is received. The pertinent information may be displayed once the user has accessed the application to include an alert update summary 422 of when the sensors are triggered and/or are not triggered so the subscriber can observe the results at any time to double check a status of the security system regardless of the notifications received.

Figure 5:
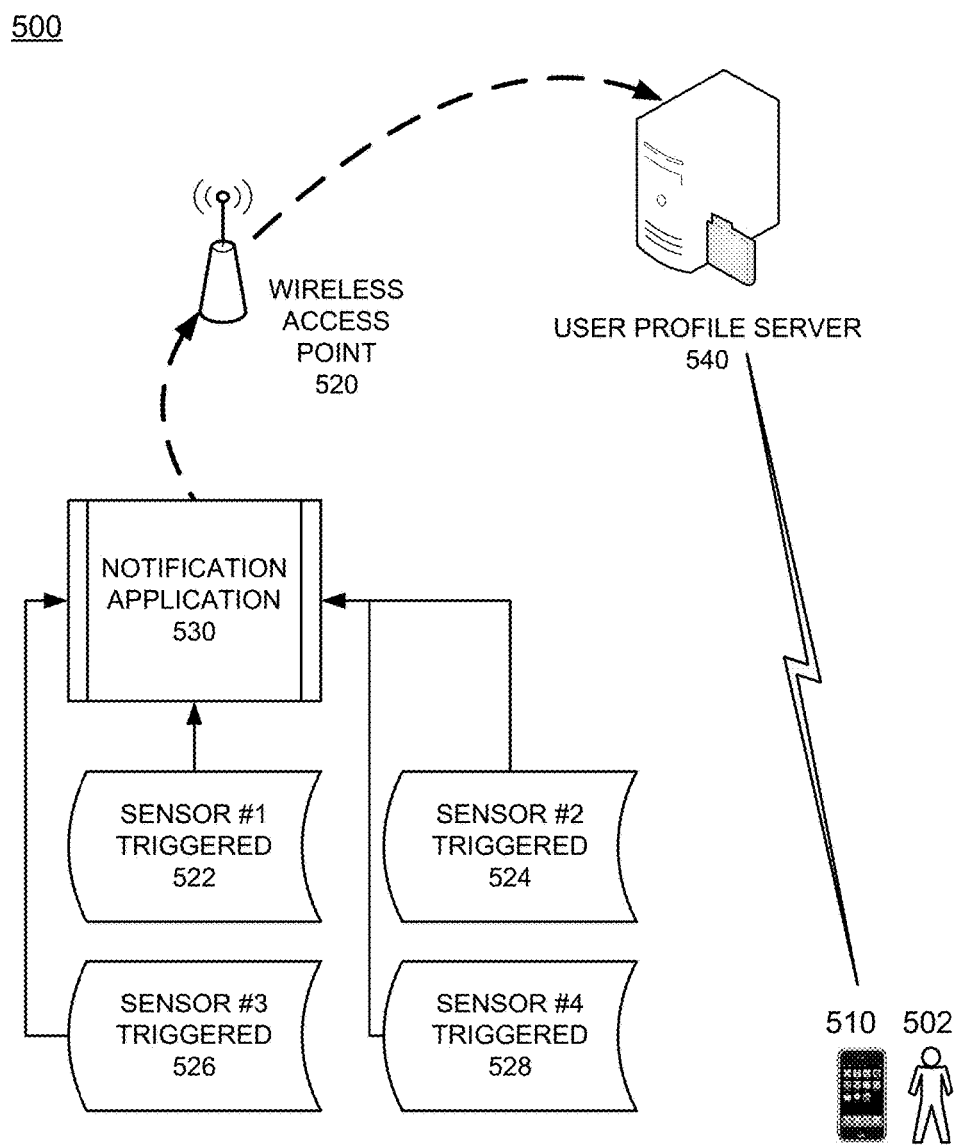
FIG. 5 illustrates an example logic data diagram of the communication application according to example embodiments of the present application.

FIG. 5 illustrates a data logic diagram 500 of the notification application 530 operating on the user's mobile device 510 and/or on the server 512. The data sources are the sensors 1-4 and the data provided corresponds to the triggered data that is sent from the sensors 522-528 to the application each time one of the sensors is triggered. The application 530 may be updated to receive the data and communicate to the server via the profile server 540. An in-home device may be necessary to collect the sensor data and to communicate with the wireless access point 520 whether it is a home router or a local base station in the nearby cellular vicinity. The data may be organized, time stamped and correlated with each sensor so the information relayed to the end user 502 is accurate for the sensor, the time and any other information stored on the server 540. The application 530 may periodically poll the home access device to identify any recent sensor triggers, such as once every 10 minutes, 30 minutes, hour, etc.

The sensors 522-528 may be linked to an update application filter that matches sensor trigger events with a predefined schedule. The filter may have a plurality of times the user would desire to know whether the sensor has been triggered and may also have a plurality of thresholds of time that are permitted to pass prior to an alert being generated. For example, the alert may be limited by a hysteresis function that permits one hour to pass beyond a time constraint variable prior to an alert being generated. For example, the user may not receive an alert if the 9 am filter criteria did not receive a sensor trigger in the kitchen but instead received one at 9:59 am.

Also, a comprehensive filtering function (CFF) may be used with the notification application 530 to limit false positives, such as instances where the alerts would be created, however, within the time frame of the next filter parameter being triggered, a corrective indication is created to eliminate the present threat. Different levels may exist in the comprehensive filtering function including, for example, no threat, elevated threat and alert triggered threat. For example, if the user establishes an alert criteria for his elderly mother triggering the bathroom sensor 522 by 9 am and another for the kitchen sensor 524 by 9:30 am, and the bathroom sensor is not triggered then the status may be elevated to elevated threat. Then, the kitchen sensor 524 is triggered in time prior to the hysteresis buffer time frame of the first missed sensor 522 (e.g., 1 hour), then the alert status may be reduced to no threat from elevated threat. Alternatively, if the kitchen sensor is also not triggered, the elevated threat may be elevated to alert triggered threat which automatically informs the user via an alert message.

Figure 6:
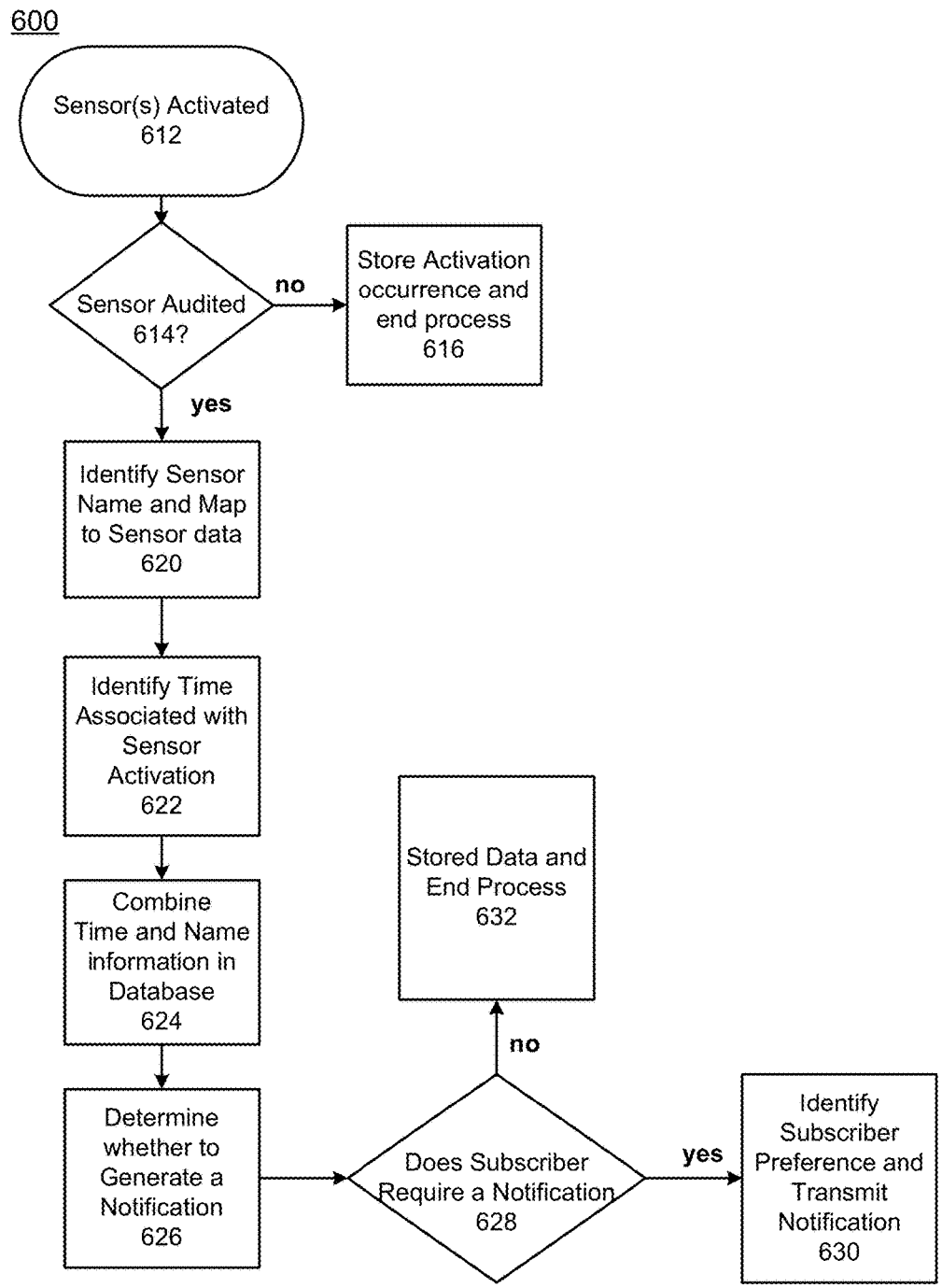
FIG. 6 illustrates an example flow diagram according to example embodiments of the present application.

FIG. 6 illustrates an example flow diagram 600 according to example embodiments. Referring to FIG. 6, the example method may begin with one or more of the sensors setup at the home being activated 612. The device that receives the sensor data may then determine whether that particular sensor data is part of a subscriber initiated audit 614. For example, the subscriber preferences may indicate that 2 of 3 sensors are audited to collect sensor activation information during a particular part of the day. While the $3^{rd}$ sensors is only audited at a different time of day. The device may store the sensor data in memory 616 and continue monitoring the sensor activation signals. If the audit indicates that the sensor data is being audited, the device may identify the sensor name (e.g., bathroom sensor, kitchen sensor, living room sensor, driveway sensor) as being paired with a particular sensor identification number 620 transmitted from the sensor during activation. Also, a timestamp 622 may be associated with the sensor activation to indicate when that particular sensor provided such data (e.g., bathroom sensor activation at 7:30 am), and that data may be stored in memory 624 and forwarded to a subscriber database/server at a remote site across a WIFI connection and/or a cellular communication medium. The subscriber information and audit information from a previous configuration may indicate whether the sensor activation data meets certain criteria needed to generate a notification 626. If the subscriber does require a notification 628, then the subscriber preferences may be accessed to determine what type of message should be created (e.g., email, text message, phone call), and that message may then be transmitted 630 to the subscriber device (e.g., smartphone). Otherwise, the data corresponding to the sensor activation may be stored in memory 632.

Figure 7:
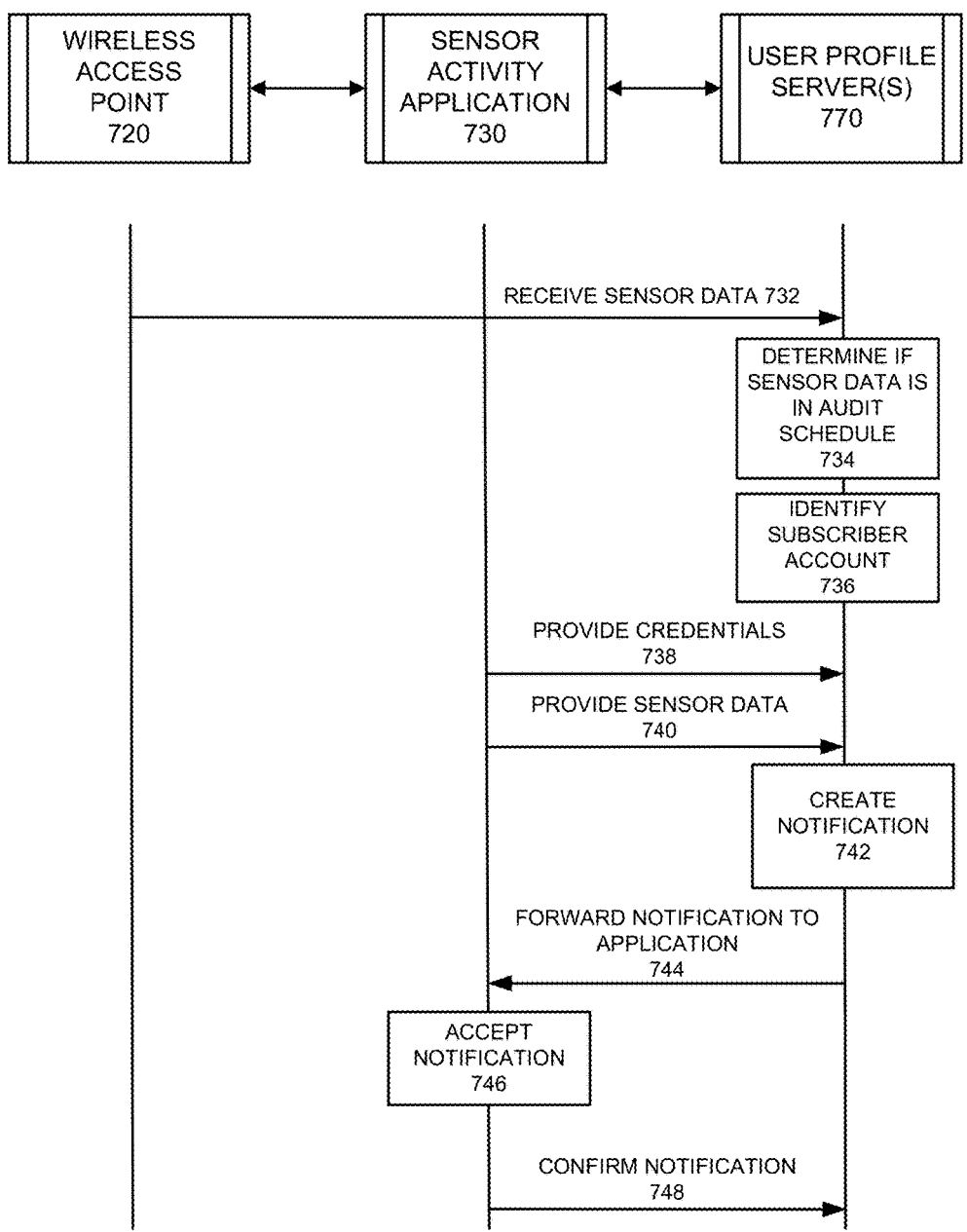
FIG. 7 illustrates an example system communication diagram of the communication between the wireless access point, the application and the remote processing server according to example embodiments.

FIG. 7 illustrates an example system signaling diagram 700. In operation, the wireless access point 720 may be a communication medium for the sensor data to be received and forwarded to a remote server 770 that stores the user profile information. Also, the sensor activity application 730 may be installed on a user device and/or the server to interpret the user profile and the corresponding sensor activation data. The sensor data 732 may be received and forwarded to the server 770. The server may then access the user profile corresponding to the sensor data to determine if the sensor data is in the audit schedule 734 for that particular user account. The subscriber account 736 may be accessed and used to pair the sensor identifier and a particular timestamp with subscriber criteria. The application may provide the subscriber credentials 738 and the sensor data 740. The server can create the notification 742 based on the subscriber requirements to have the notification generated for a particular sensor at a particular time or based on filtering criteria. The notification may then be transmitted to the application 744 on the user device, which may then accept the notification 746 and transmit a confirmation 748 that the message was received.

Figure 8:
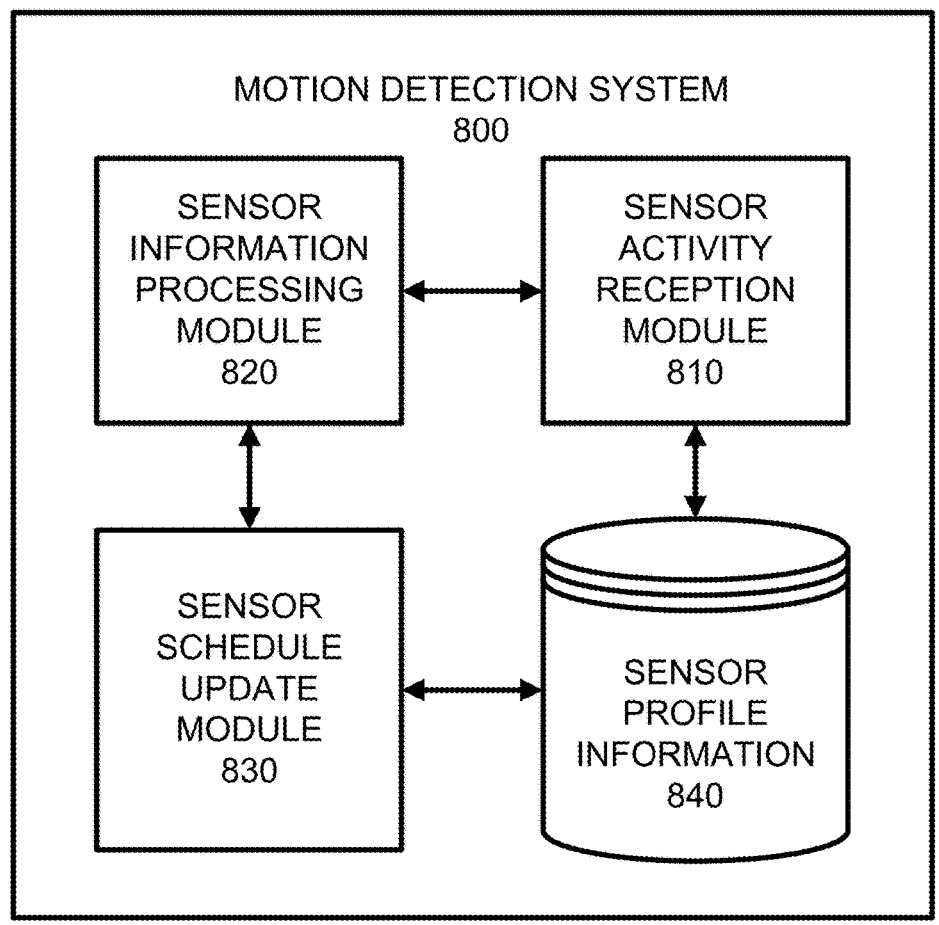
FIG. 8 illustrates an example motion detection and reporting system configuration according to example embodiments.

FIG. 8 illustrates a motion detection system 800 that may include various processing modules used to perform one or more operations of the present application. Referring to FIG. 8, the sensor activity reception module 810 may receive sensor data from at least one sensor that has been activated at a remote location, such as a home. The sensor information processing module 820 may then identify a subscriber account associated with the sensor data and match the sensor data with a predefined sensor identifier stored in the subscriber account at the database 840. The sensor update module 830 may then generate a notification to include the predefined sensor identifier and a time reference indicator associated with a time the sensor data was activated.

Additionally, the sensor activation criteria may be identified to determine whether to generate the notification based on the received sensor data and the sensor activation criteria which includes a predefined selection of at least sensor being activated within a predefined time interval (e.g., bathroom sensor between 5 am and 10 am). The sensor may also include a number of sensors and the sensor activation criteria may include a predefined selection of the various sensors being activated within a number of corresponding predefined time intervals that are the same, different, overlapping, non-overlapping, etc. to customize the audit criteria for the subscriber. The sensor activation criteria may include at least one of the sensors not being activated within the predefined time interval and the notification may be transmitted to a subscriber device associated with the subscriber account. The notification may include at least one notification type including an email, a text message, and an automated phone call, and the subscriber account may specify a subscriber preference for the notification type.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 9 illustrates an example network element 900, which may represent any of the above-described network components of the other figures.

Figure 9:
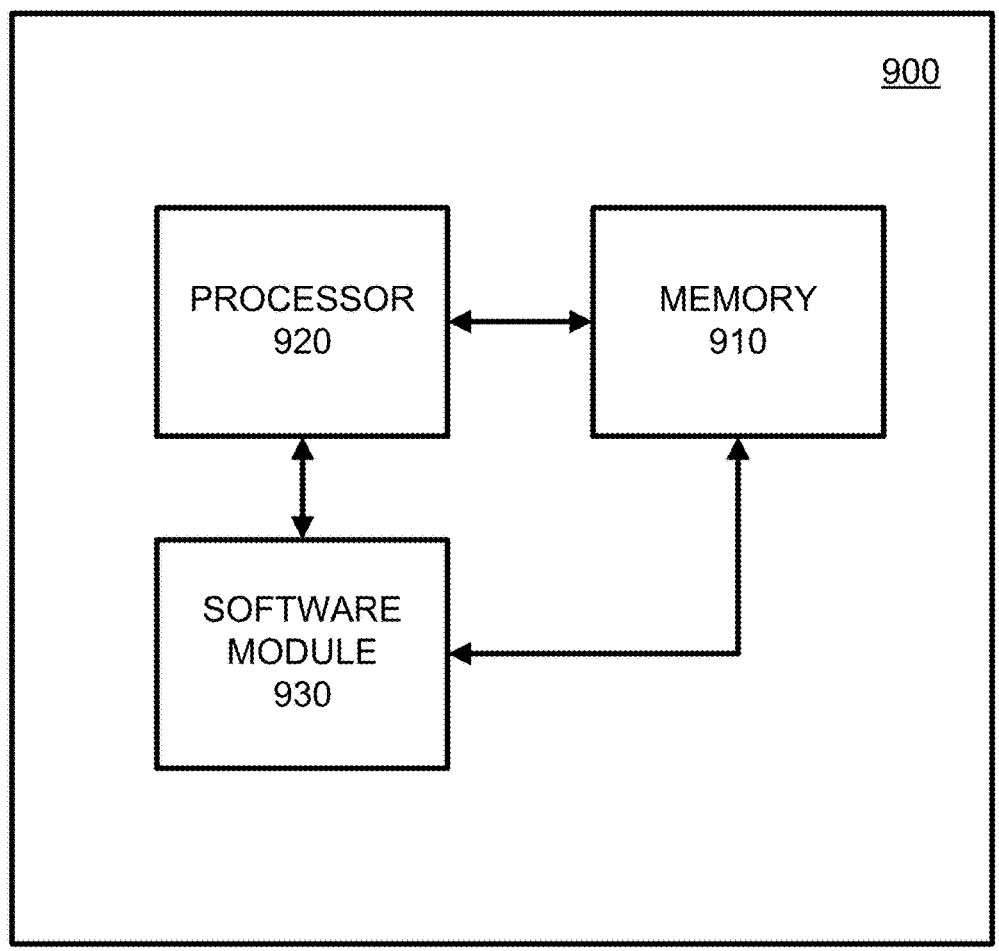
FIG. 9 illustrates an example network entity device configured to store instructions, software, and corresponding hardware for executing the same, according to example embodiments of the present application.

As illustrated in FIG. 9, a memory 910 and a processor 920 may be discrete components of the network entity 900 that are used to execute an application or set of operations. The application may be coded in software in a computer language understood by the processor 920, and stored in a computer readable medium, such as, the memory 910. The computer readable medium may be a non-transitory computer readable medium that includes tangible hardware components in addition to software stored in memory. Furthermore, a software module 930 may be another discrete entity that is part of the network entity 900, and which contains software instructions that may be executed by the processor 920. In addition to the above noted components of the network entity 900, the network entity 900 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 8 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
receiving sensor data from at least one sensor that has been activated at a remote location;
matching the sensor data with a predefined sensor identifier; and
identifying a sensor activation criteria to determine whether to generate a notification based on the received sensor data;
wherein the sensor activation criteria comprises at least another sensor related to the at least one sensor not being activated within a predefined time interval, and
wherein the at least another sensor is situated at a second location and is configured to measure a second activity, the second activity scheduled to follow a first activity measured by the at least one sensor.

2. The method of claim 1, further comprising generating the notification to include the predefined sensor identifier and a time reference indicator associated with a time the sensor data was activated.

3. The method of claim 1, wherein the sensor activation criteria comprises a predefined selection of the another sensor being activated within the predefined time interval.

4. The method of claim 3, wherein the at least one sensor comprises a plurality of sensors and the sensor activation criteria comprises the predefined selection of the plurality of sensors being activated within a plurality of corresponding predefined time intervals.

5. The method of claim 3, wherein the at least one sensor comprises a plurality of sensors and the sensor activation criteria comprises at least one of the plurality of sensors not being activated within the predefined time interval.

6. The method of claim 1, further comprising transmitting the notification to a subscriber device associated with a subscriber account.

7. The method of claim 6, wherein the notification comprises at least one notification type including an email, a text message, and an automated phone call, and wherein the subscriber account specifies a subscriber preference for the notification type.

8. An apparatus, comprising:
a receiver configured to receive sensor data from at least one sensor that has been activated at a remote location; and
a processor configured to
match the sensor data with a predefined sensor identifier, and
identify a sensor activation criteria to determine whether to generate the notification based on the received sensor data;
wherein the sensor activation criteria comprises at least another sensor related to the at least one sensor not being activated within a predefined time interval and
wherein the at least another sensor is situated at a second location and is configured to measure a second activity, the second activity scheduled to follow a first activity measured by the at least one sensor.

9. The apparatus of claim 8, wherein the processor is further configured to generate the notification to include the predefined sensor identifier and a time reference indicator associated with a time the sensor data was activated.

10. The apparatus of claim 8, wherein the sensor activation criteria comprises a predefined selection of the another sensor being activated within the predefined time interval.

11. The apparatus of claim 10, wherein the at least one sensor comprises a plurality of sensors and the sensor activation criteria comprises the predefined selection of the plurality of sensors being activated within a plurality of corresponding predefined time intervals.

12. The apparatus of claim 10, wherein the at least one sensor comprises a plurality of sensors and the sensor activation criteria comprises at least one of the plurality of sensors not being activated within the predefined time interval.

13. The apparatus of claim 8, further comprising a transmitter configured to transmit the notification to a subscriber device associated with a subscriber account.

14. The apparatus of claim 13, wherein the notification comprises at least one notification type including an email, a text message, and an automated phone call, and wherein the subscriber account specifies a subscriber preference for the notification type.

15. A non-transitory computer readable storage medium configured to store instructions that when executed cause a processor to perform:
receiving sensor data from at least one sensor that has been activated at a remote location;
matching the sensor data with a predefined sensor identifier; and
identifying a sensor activation criteria to determine whether to generate a notification based on the received sensor data;
wherein the sensor activation criteria comprises at least another sensor related to the at least one sensor not being activated within a predefined time interval, and
wherein the at least another sensor is situated at a second location and is configured to measure a second activity, the second activity scheduled to follow a first activity measured by the at least one sensor.

16. The non-transitory computer readable storage medium of claim 15, wherein the processor is further configured to perform generating the notification to include the predefined sensor identifier and a time reference indicator associated with a time the sensor data was activated.

17. The non-transitory computer readable storage medium of claim 15, wherein the sensor activation criteria comprises a predefined selection of the another sensor being activated within the predefined time interval.

18. The non-transitory computer readable storage medium of claim 17, wherein the at least one sensor comprises a plurality of sensors and the sensor activation criteria comprises the predefined selection of the plurality of sensors being activated within a plurality of corresponding predefined time intervals.

19. The non-transitory computer readable storage medium of claim 17, wherein the at least one sensor comprises a plurality of sensors and the sensor activation criteria comprises at least one of the plurality of sensors not being activated within the predefined time interval.

20. The non-transitory computer readable storage medium of claim 15, wherein the processor is further configured to perform transmitting the notification to a subscriber device associated with a subscriber account, wherein the notification comprises at least one notification type including an email, a text message, and an automated phone call, and wherein the subscriber account specifies a subscriber preference for the notification type.

* * * * *